US009693038B2

(12) United States Patent
McCloskey et al.

(10) Patent No.: US 9,693,038 B2
(45) Date of Patent: Jun. 27, 2017

(54) SYSTEMS AND METHODS FOR IMAGING

(71) Applicant: Hand Held Products, Inc., Fort Mill, SC (US)

(72) Inventors: Scott McCloskey, Minneapolis, MN (US); Ben Miller, Minneapolis, MN (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/096,528

(22) Filed: Apr. 12, 2016

(65) Prior Publication Data
US 2016/0316190 A1    Oct. 27, 2016

Related U.S. Application Data

(60) Provisional application No. 62/150,352, filed on Apr. 21, 2015.

(51) Int. Cl.
*H04N 13/02* (2006.01)
*G06T 5/50* (2006.01)
(Continued)

(52) U.S. Cl.
CPC ..... *H04N 13/0228* (2013.01); *G06K 7/10811* (2013.01); *G06K 7/10831* (2013.01);
(Continued)

(58) Field of Classification Search
CPC .... H04N 13/0228; H04N 13/004; G06T 7/55; G06T 7/593; G06T 5/50;
(Continued)

(56) References Cited

U.S. PATENT DOCUMENTS 6,832,725 B2    12/2004  Gardiner et al.
7,128,266 B2    10/2006  Zhu et al.
(Continued)

FOREIGN PATENT DOCUMENTS

EP    3086281 A1    10/2016
WO    2013096104 A1    6/2013
(Continued)

OTHER PUBLICATIONS

Xinqing Guo et al., "Barcode Imaging Using a Light Field Camera", Sep. 6-7 and 12, 2014, ECCV, 2014 workshops, pp. 519-532.*
(Continued)

*Primary Examiner* — Ted Barnes
(74) *Attorney, Agent, or Firm* — Additon, Higgins & Pendleton, P.A.

(57) ABSTRACT

An imaging device has a light field imager and a processor. The light field imager includes a microlens array, and a light field sensor positioned proximate to the microlens array, having a plurality of pixels and recording light field data of an optical target from light passing through the microlens array. The processor is configured to: receive the light field data of the optical target from the light field sensor, estimate signal to noise ratio and depth of the optical target in the light field data, select a subset of sub-aperture images based on the signal to noise ratio and depth, combine the selected subset of sub-aperture images, and perform image analysis on the combined subset of sub-aperture images.

20 Claims, 6 Drawing Sheets

(51) Int. Cl.
*G06K 7/10* (2006.01)
*G06K 7/14* (2006.01)
*G06K 9/00* (2006.01)
*H04N 13/00* (2006.01)
*G06T 7/55* (2017.01)
*G06T 7/593* (2017.01)

(52) U.S. Cl.
CPC ....... *G06K 7/10841* (2013.01); *G06K 7/1413* (2013.01); *G06K 9/00255* (2013.01); *G06K 9/00288* (2013.01); *G06K 9/00604* (2013.01); *G06K 9/00617* (2013.01); *G06T 5/50* (2013.01); *G06T 7/55* (2017.01); *G06T 7/593* (2017.01); *H04N 13/004* (2013.01); *G06T 2207/10028* (2013.01); *G06T 2207/10052* (2013.01); *G06T 2207/20212* (2013.01); *G06T 2207/30201* (2013.01); *G06T 2207/30204* (2013.01)

(58) Field of Classification Search
CPC ...... G06T 2207/10028; G06K 9/00617; G06K 7/10811; G06K 7/10831; G06K 9/00288; G06K 9/00604; G06K 9/00255; G06K 7/1413; G06K 7/10841
See application file for complete search history.

(56) References Cited

U.S. PATENT DOCUMENTS

| | | |
|---|---|---|
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,308 B2 | 12/2013 | He et al. |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,811,769 B1 * | 8/2014 | Pitts .................. G06T 3/40 382/275 |
| 8,820,630 B2 | 9/2014 | Qu et al. |
| 8,822,848 B2 | 9/2014 | Meagher |
| 8,824,692 B2 | 9/2014 | Sheerin et al. |

(56) References Cited

U.S. PATENT DOCUMENTS

| | | |
|---|---|---|
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,973,826 B2 | 3/2015 | He et al. |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,317 B1 * | 3/2015 | Liang .............. G06T 15/00 345/32 |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 * | 12/2015 | Ackley .............. G06K 7/10811 |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 * | 5/2016 | McCloskey ........ G06K 7/10831 |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0161399 A1 * | 6/2013 | He .................. G06K 7/10722 235/462.41 |
| 2013/0175341 A1 | 7/2013 | Kearney et al. |
| 2013/0175343 A1 | 7/2013 | Good |
| 2013/0222633 A1 * | 8/2013 | Knight .............. H04N 5/23293 348/222.1 |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |

(56) References Cited

U.S. PATENT DOCUMENTS

| | | |
|---|---|---|
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0097252 A1* | 4/2014 | He .................. G06K 7/10722 235/462.41 |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0133755 A1* | 5/2014 | McCloskey ............ G06T 11/60 382/173 |
| 2014/0136208 A1 | 5/2014 | Maltseff et al. |
| 2014/0140585 A1 | 5/2014 | Wang |
| 2014/0146201 A1* | 5/2014 | Knight .................. H04N 9/04 348/231.99 |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0239071 A1* | 8/2014 | Hennick ............ G06K 7/10732 235/455 |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0300646 A1* | 10/2014 | Pitts .................... G06T 3/40 345/660 |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161427 A1* | 6/2015 | Guo .................... G06K 7/146 235/462.08 |
| 2015/0161429 A1 | 6/2015 | Xian |

(56) References Cited

U.S. PATENT DOCUMENTS

| | | |
|---|---|---|
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0173844 A1* | 6/2016 | Knight .............. H04N 9/04 348/222.1 |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz, Sr. et al. |
| 2016/0314294 A1 | 10/2016 | Kubler et al. |
| 2016/0353007 A1* | 12/2016 | Sabater ............ H04N 5/2254 |

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

Extended European search report in related EP Application No. 16165188.0, dated Sep. 16, 2016, 11 pages.

Gou et al. "Barcode Imaging Using a Light Field Camera," Computer Vision—ECCV 2014 Workshops, dated Mar. 20, 2015, pp. 519-532, [Retrieved from the Internet: URL: http://rd.springer.com/content/pdf/10.1007/978-3-319-16181-5_40.pdf; [Retrieved on Sep. 12, 2016]].

Ng, Ren "Digital light field Photography," Dissertation Department of Computer Science, Stanford University, Dated Jul. 1, 206, pp. 1-203. [URL: http: //stanford. edu/class/ee367/reading/ Ren%20Ng-thesis%20Lytro.pdf [retrieved on Oct. 20, 2011]].

McCloskey Scott: "Masking Light Fields to Remove Partial Occlusion",International Conference on Pattern Recognition, IEEE Computer Society, US, Aug. 24, 2014 (Aug. 24, 2014), pp. 2053-2058, [retrieved on Dec. 4, 2014].

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Bamdringa); 38 pages.

U.S. Appl. No. 14/740,373 for Calibrating a Volume Dimensioner filed Jun. 16, 2015 (Ackley et al.); 63 pages.

* cited by examiner

SYSTEMS AND METHODS FOR IMAGING

CROSS-REFERENCE TO RELATED APPLICATIONS

The present application claims the benefit of U.S. Patent Application No. 62/150,352 for Systems and Methods for Imaging filed Apr. 21, 2015, which is hereby incorporated by reference in its entirety.

The present application is related to U.S. patent application Ser. No. 14/566,464 for Barcode Imaging filed Dec. 10, 2014 (and published Jun. 11, 2015 as U.S. Patent Publication No. 2015/0161427), which claims the benefit of U.S. Patent Application No. 61/914,256 for Bar Code Identification filed Dec. 10, 2013. Each of the foregoing patent applications and patent publication is hereby incorporated by reference in its entirety.

FIELD OF THE INVENTION

The invention is generally related to systems and methods of light field imaging, and, more specifically, to systems and methods reducing computational complexity of light field imaging.

BACKGROUND

Indicia scanners often have fixed focus optics because mechanical focusing systems lack robustness to mechanical shocks, among other issues. The result is that scanners have limited depth of field, and the onus is on a user to position the object within that depth of field; various sub-models of a given scanner are made to address different scan ranges.

Additionally, the acceptable processing time for barcode readers is very short, as they are used in high-throughput settings such as grocery checkout counters. As such, there is a need to develop barcode readers that allow for a larger scanning depth of field while (a) still being robust to mechanical shocks and/or (b) providing a rapid response to the user.

To remove these limitations, there is an interest in using light field cameras for scanning. Light field cameras use a microlens array in the optical path to capture a set of light rays that can be combined in software to produce images focused at various distances. Light field imaging systems allow a user to capture four dimensional (4D) images that provide additional imaging information than can be provided by typical imaging systems. For example, a light field imaging array system can provide both spatial and angular light ray information.

A drawback associated with light field scanning is that the computational complexity of the refocusing operation is high compared to more traditional two dimensional image sensors. For example, typically, when light field imaging systems are utilized, the image data is analyzed, segmented into parts, and several re-focused images are created wherein each corresponding image is focused on different depths within the image as a whole. In order to do this, an objective function (e.g. sharpness) is maximized over the several re-focused images in order to determine the one providing highest contrast, and corresponding to the depth of the barcode in the scene. This higher computational complexity can cause unacceptably long delays between image capture and symbol decoding (e.g., decoding a barcode in the captured image).

An alternative to this approach is to analyze the scene in the Fourier domain, but this is slow because a large matrix must be transformed into the Fourier domain. The processing time of these methods can be slower than is desirable, in some applications.

SUMMARY

In one aspect of the invention, an imaging device comprises: a light field imager comprising a microlens array, and a light field sensor positioned proximate to the microlens array, having a plurality of pixels and recording light field data of an optical target from light passing through the microlens array; and a processor configured to: receive the light field data of the optical target from the light field sensor, estimate signal to noise ratio and depth of the optical target in the light field data, select a subset of sub-aperture images based on the signal to noise ratio and depth, combine the selected subset of sub-aperture images, and perform image analysis on the combined subset of sub-aperture images.

In an embodiment, the light field data comprises a plurality of sub-aperture images.

In an embodiment, estimating the signal to noise ratio is performed using sensor characterization.

In an embodiment, sensor characterization includes sensor noise level, gain, exposure time, or any combination thereof.

In another embodiment, sensor characterization is determined from pixel intensities.

In an embodiment, estimating depth of the optical target from the light field imager is directly determined from the light field data.

In another embodiment, estimating depth of the optical target from the light field imager is through registration of two sub-aperture images.

In an embodiment, a pre-determined table of optimal subsets of sub-aperture images at different signal to noise ratios and depths of a theoretical optical target from the light field imager.

In an embodiment, the subset of sub-aperture images is selected from the pre-determined table.

In another embodiment, combining the subset of sub-aperture images includes a quantized shifting and adding together the subset of sub-aperture images.

In an embodiment, the imaging device is an indicia scanner.

In an embodiment, the image analysis is facial recognition.

In an embodiment, the image analysis is iris recognition.

In another aspect of the invention, a method comprises: capturing light field data of an optical target with a light field sensor; estimating signal to noise ratio and depth of the optical target in the light field data; selecting a subset of sub-aperture images based on the signal to noise ratio and depth; combining the selected subset of sub-aperture images; and performing image analysis on the combined subset of sub-aperture images.

In an embodiment, the light field data comprises a plurality of sub-aperture images.

In another embodiment, estimating the signal to noise ratio is performed using sensor characterization of sensor noise level, gain, exposure time, or any combination thereof.

In another embodiment, estimating depth of the optical target from the light field imager is determined directly from the light field data.

In yet another embodiment, estimating depth of the optical target from the light field imager is through registration of two sub-aperture images.

In an embodiment, the subset of sub-aperture images is selected from a pre-determined table comprising optimal subsets of sub-aperture images at different signal to noise ratios and depths of a theoretical optical target from the light field imager.

In an embodiment, combining the subset of sub-aperture images includes a quantized shifting and adding together the subset of sub-aperture images.

BRIEF DESCRIPTION OF THE DRAWINGS

The invention will now be described by way of example, with reference to the accompanying Figures, of which.

DETAILED DESCRIPTION

While the following description is directed towards the field of indicia scanners and resolution of decodable indicia, those of ordinary skill in the art would recognize that the apparatus and methods described herein are generally applicable to other imaging applications. Thus, the use of indicia scanners is exemplary, and the invention should not be limited thereto. U.S. patent application Ser. No. 14/566,464 discloses a method to find a barcode within an image frame and to determine a distance from the scanner to a target object. The following disclosure improves upon existing methods for combining multiple rays to produce an image.

In industrial imaging applications, large volumes of imagery are captured for non-aesthetic uses, which would incur high computational costs if image processing were performed with standard methods. However, while high quality images are often desired in consumer photography, image quality is binary for pattern recognition systems: the image quality is either above or below a predetermined threshold level that supports reliable recognition. Once that threshold is surpassed, any additional effort to improve image quality is wasted. Pattern recognition systems, such as indicia scanners, need light field processing which produce satisfactory image quality at the least computational expense. Light field cameras, such as the light field camera 1 shown in an embodiment of FIG. 1, simultaneously capture multiple "views" of a scene; and for example in the case of microlens-based light field imagers, these "views" are also referred to as sub-aperture images (SAIs), and correspond to images formed by light passing through a particular region of the main lens' aperture. See FIGS. 1a and 1b discussed in detail below.

The computational complexity of processing is proportional to the number of views combined, and to the precision of view-to-view registration. While computational effort can always be reduced at the expense of image quality, selecting SAIs via a naive or greedy algorithm is sub-optimal, because the selected SAIs may not be the computationally simplest to combine. Thus, by determining the optimal number and selection of SAIs to be combined in refocusing, the computational complexity of light field rendering (i.e. refocusing) can be greatly reduced.

In an embodiment, the computational complexity of light field rendering can be reduced by making a poorer quality image. In other words, one of the general objectives is to generate an image which is just above the threshold of decodability, using a minimal amount of computation, rather than generating an aesthetically-pleasing image. Since the computational complexity of light field rendering is proportional to the number of angular views combined, fast refocusing can be obtained by using a minimal number of such views (SAIs), and choosing the minimal number with respect to how much computation is needed.

Figure 1A:
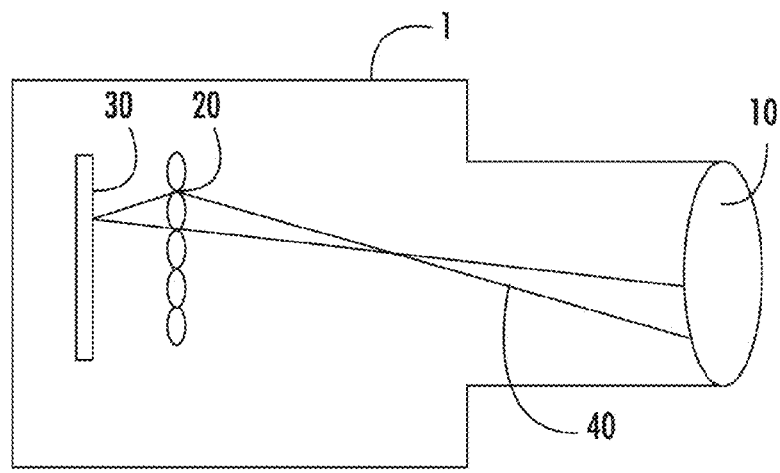
FIG. 1a is a schematic view of a light field imager.
Figure 1B:
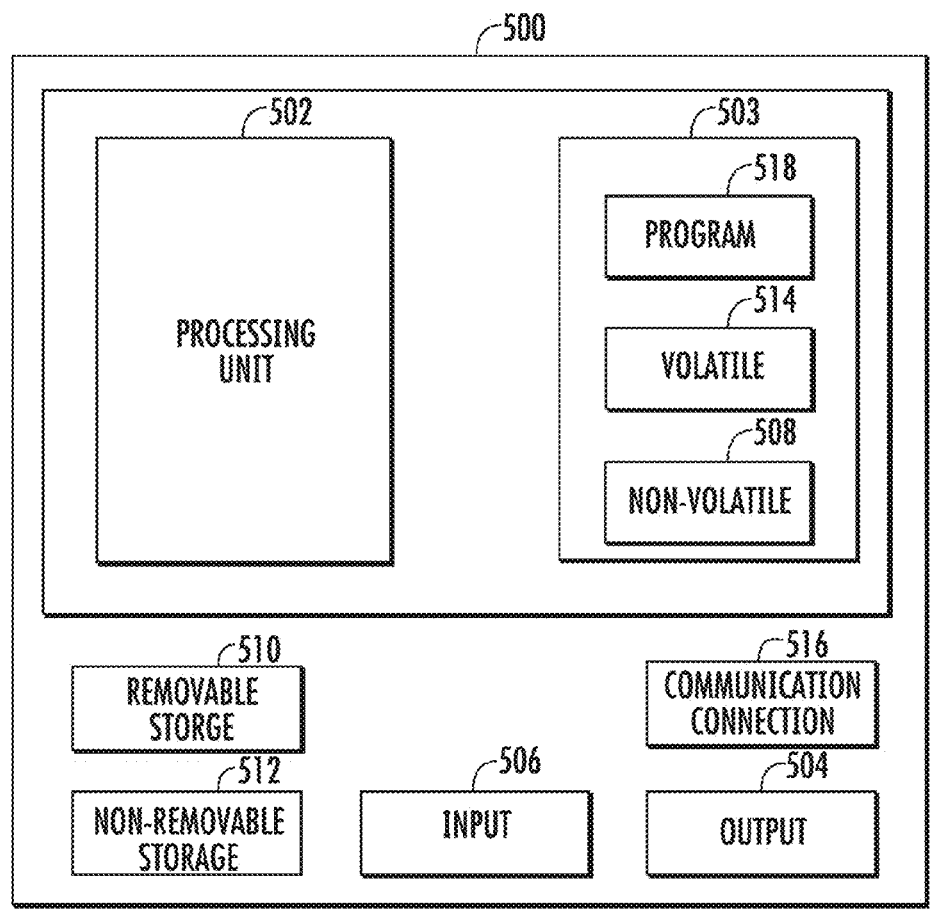
FIG. 1b is a schematic view of a computer system of the light field imager.

In the embodiments shown in FIGS. 1a and 1b, a light field imager 1 includes a main lens 10, microlens array 20, light field sensor 30, memory 503, and processing unit 502 (e.g. a processor). The light field sensor 30 is in electrical communication with the memory 503 and/or the processing unit 502. As shown in FIG. 1a, the light field sensor 30 is positioned proximate to the microlens array 20, having a plurality of pixels (not shown) and recording light field data of an optical target from light 40 passing through the microlens array 20.

In the embodiment shown in FIG. 1b, an exemplary computer system 500 implements the disclosed methods. All components need not be used in various embodiments. One exemplary computing device is in the form of a computer 500, and includes one or more of a processing unit 502, memory 503, removable storage 510, and non-removable storage 512. Although the exemplary computing device is shown and described as computer 500, the computing device can be in different forms in different embodiments. For example, as described above, the computing device can be a light field imager 1 such as Lytro™ or other commercially available light field cameras, or a smartphone, a tablet, or other computing device including the same or similar elements as illustrated and described with regard to FIG. 1b. Further, although the various data storage elements are illustrated as part of the computer 500, the storage can also or alternatively include cloud-based storage accessible via a network, such as the Internet.

Memory 503 can include volatile memory 514 and non-volatile memory 508. Computer 500 includes or has access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 can include or have access to a computing environment that includes input 506, output 504, and a communication connection 516. Output 504 can include a display device, such as a touchscreen, that also can serve as an input device. The input 506 can include one or more of a touchscreen, touchpad, mouse, keyboard, camera, one or more device-specific buttons, one or more sensors integrated within or coupled via wired or wireless data connections to the computer 500, and other input devices. The computer can operate in a networked environment using a communication connection to connect to one or more remote computers, such as database servers. The remote computer can include a personal computer (PC), server, router, network PC, a peer device or other common network node, or the like. The communication connection can include a Local Area Network (LAN), a Wide Area Network (WAN), cellular, WiFi, Bluetooth, or other networks.

Computer-readable instructions stored on a computer-readable medium are executable by the processing unit 502 of the computer 500. A hard drive, CD-ROM, and RAM are some examples of articles including a non-transitory computer-readable medium such as a storage device. The terms computer-readable medium and storage device do not include carrier waves. For example, a computer program 518 capable of providing a generic technique to perform access control check for data access and/or for doing an operation on one of the servers in a component object model (COM) based system can be included on a CD-ROM and loaded from the CD-ROM to a hard drive. The computer-readable instructions allow computer 500 to provide generic access controls in a COM based computer network system having multiple users and servers.

Baseline Complexity

Conventional light field processing for pattern recognition involves at least three steps which are computationally intensive: (1) interpolating SAIs from the raw sensor image, (2) locating and estimating the depth of the target region, and (3) combining the SAIs to a refocused image. The complexity of steps (1) and (3) is proportional to the number of SAIs which are combined during refocusing, so minimizing the number of SAIs reduces the computational complexity. In an embodiment, correspondence based depth estimation is employed for time-constrained applications, because correspondence based depth estimation can be used with as few as two SAIs. Additionally, domain-specific depth estimation methods can eliminate the need to interpolate SAIs from the sensor image, such as described in U.S. patent application Ser. No. 14/566,464, which has been incorporated by reference, which describes in detail domain-specific depth estimation for 1D barcodes, although those of ordinary skill in the art would understand that other known depth estimation methods can also be used, such as Fourier domain methods.

In conventional shift-and-add refocusing algorithms, the light field is represented as a set L of sub-aperture images (SAIs), each of whose pixels record light passing through a specific region of the main lens aperture. The central SAI $L^{0,0}$ is made up of light passing through the center of the main lens aperture, with the central SAI pixels being located at the center of a spot behind each microlens. In general, SAIs are denoted $L^{(u,v)}$, where u and v respectively denote the horizontal and vertical displacement of the constituent rays/pixels relative to aperture/spot center; $u_{max}$ to denote the radius of the microlens spots, so u, v≤$u_{max}$. Each target depth corresponds to a unique value Δ (the 'shift') such that the refocused image at pixel (x, y) is sharply focused at that depth when:

$$R(x,y)=\int_u\int_v L^{(u,v)}(x+u\Delta,y+v\Delta)du\,dv. \quad (1)$$

Because microlens sampling in u,v is usually sparse, out of focus regions of R may appear aliased without interpolating additional views. In an embodiment, interpolation and integrating additional views can be avoided by only rendering a target region, where different views are added as:

$$R(x, y) = \sum_u \sum_v L^{(u,v)}(x + u\Delta, y + v\Delta). \quad (2)$$

In an embodiment, the complexity of the shift-and-add refocusing algorithm for each pixel in the refocused image according to equation 2, is that combining n SAIs involves the summation of n terms. If Δ is an integer, the summands can be found via lookup in the corresponding SAI, and equation 2 is n−1 additions. When uΔ and vΔ are not integers, though, refocusing also involves n−1 2D interpolations. Thus, in an embodiment, when Δ is an integer, shifting and adding one SAI to another is approximately 4× faster than a 2D interpolation with a non-integer shift.

Quantizing the Refocus Parameter

The drawback of quantization is that the multiple views are misregistered before the summation, causing defocus in R. When Δ is rounded to the nearest integer, quantization error is bounded by 0.5 pixel, and a radius of the blur spot is bounded by $u_{max}/2$ pixels in R.

In an embodiment using 1D and 2D barcode scanning as an example, empirically, barcode decoders do not support integer quantization of the refocus shift when applied to light field images, such as those captured by the Lytro™ camera, where $u_{max}$=5. This is shown by refocusing light field images of a barcode 200 taken at a distance where the smallest bar maps to about 1.5 pixels.

Figure 3:
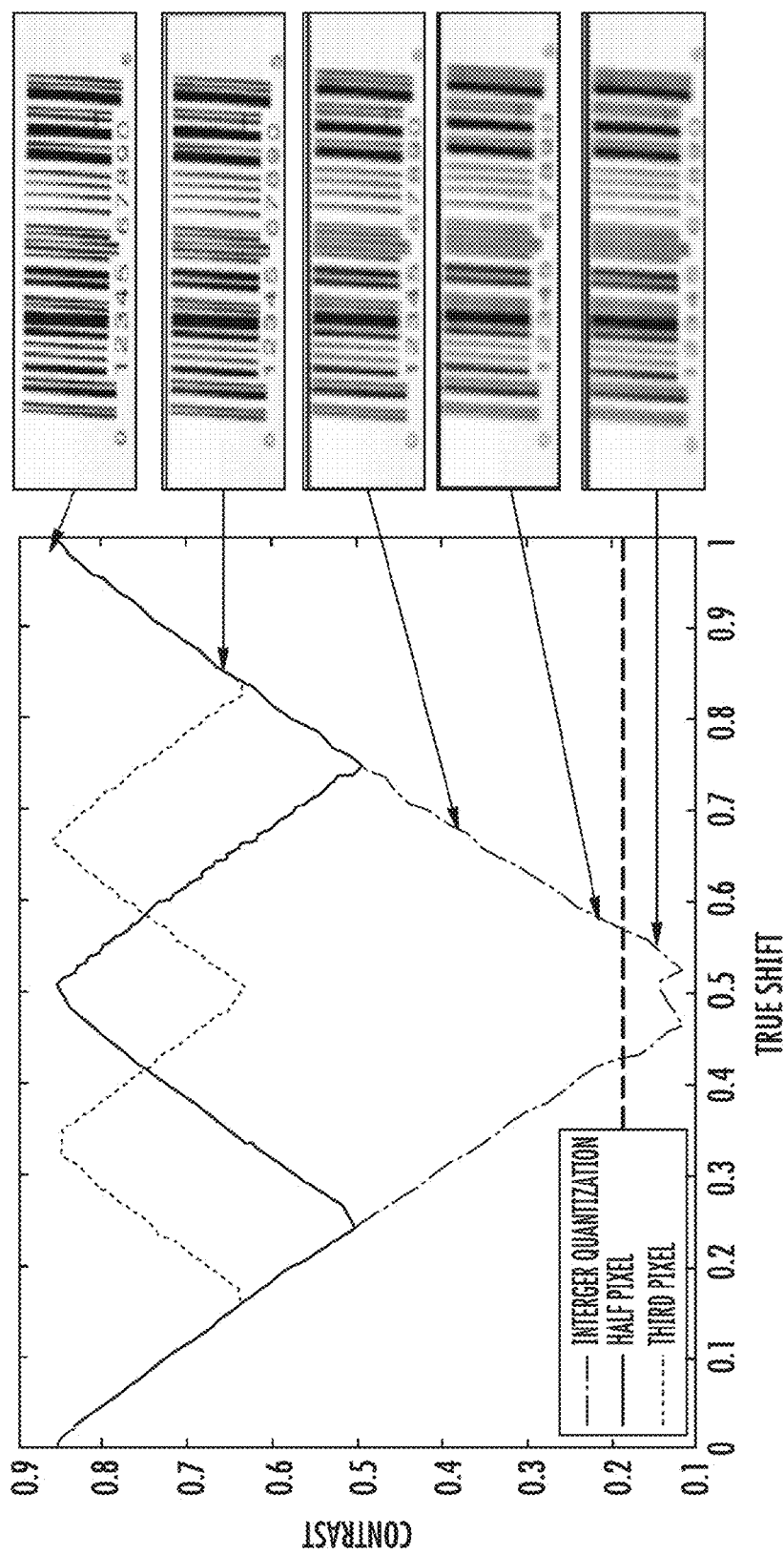
FIG. 3 is a graphical representation of rounding reducing image contrast in proportion to quantization error as true shift varies.

As shown for example in FIG. 3, as the true shift varies continuously over the range [0, 1], rounding reduces the contrast in proportion to quantization error. Integer quantization can reduce contrast below a threshold value of 0.19, where decoding is unsuccessful. Quantizing the shift in half- or third-pixel increments, though, bounds contrast above this threshold, where decoding is successful. When correspondence-only depth estimation contributes additional error, the interval can be chosen so that the net effect of quantization plus a statistical expectation of the depth error produces a result with enough contrast. While half- or third-pixel quantization steps do not avoid interpolation altogether, they do reduce the number of interpolations that are needed. When the quantization steps are 1/q, any two SAIs $L^{(u1,v1)}$ and $L^{(u2,v2)}$ can be combined without interpolation if $u_1=u_2$ mod q and $v_1=v_2$ mod q. Using half pixel (i.e., q=2) quantization steps, and rounding Δ to $\Delta_q$, equation 2 can be re-written as $$R(x,y)=R^{(0,0)}(x,y)+R^{(1,0)}(x+\Delta_q,y)+R^{(0,1)}(x,y+\Delta_q)+ R^{(1,1)}(x+\Delta_q,y+\Delta_q) \quad (3)$$

where the superscripts on R represent the residue of (u, v) modulo q.

As an example, $$R^{(0,0)}(x, y) = \sum_u \sum_v L^{2u,2v}(x + 2u\Delta_q, y + 2v\Delta_q), \quad (4)$$

with the appropriate bounds on u and v. Generating these Rs avoids interpolation because $q\Delta_q$ is necessarily an integer, i.e. the SAIs in this sum all have integer shifts with respect to one another. Sets containing the summands of the various R are referred to as 'integer shift classes' R since each member can be combined with any other via an integer shift and, e.g., denote as $R^{(0,0)}$ the summands in equation 4. The number of interpolations needed to produce R is reduced to 3 when q=2, and $q^2-1$ in general. Additionally, while $R^{(1,1)}$ still requires bi-linear interpolation in equation 3, $R^{(0,1)}$ and $R^{(1,0)}$ require only linear interpolation. So when q=2, refocusing is reduced from n−1 2D interpolations to 2 1D and 1 2D interpolation.

In a microlens-based light field camera, each view of the scene is taken through the same aperture size, so combining additional views doesn't improve sharpness. Combining multiple views maintains the sharpness associated with tin times the f-number, but gives a SNR consistent with the full lens aperture (f/2 in the case of the Lytro™ camera). But, depending on the illumination conditions, the full aperture may not be needed to produce a recognizable image; if the exposure time is long enough, the central SAI may itself be recognizable and refocusing unnecessary. The purpose of refocusing in a recognition system is to produce an image of the target which meets or exceeds a threshold SNR—in as little time as possible. So this section describes how to dynamically (i.e., taking into account image exposure) find the number of views needed to produce a recognizable image.

Since each image-based recognition algorithm will have its own signal to noise ratio (SNR) requirements, a function SNR(A) can be generalized, and quantifies the quality of an image refocused using the SAIs in A, and a threshold r on this quantity, satisfying: SNR(A∪B)=SNR(A)+SNR(B)−SNR(A∩B), where zero bias is SNR({ })=0. A minimum threshold where a refocused target will be recognizable is if SNR(•)>=τ. The ordering is reflected by: SNR($\{L^{(u1,v1)}\}$)>SNR($\{L^{(u2,v2)}\}$) if $\|(u_1, v_1)\| < \|(u_2, v_2)\|$.

Ordering reflects the fact that, because of microlens vignetting, the signal component of an SAI decreases with $\|(u,v)\|$ while significant noise sources (from dark current and readout) remain fixed. In an embodiment, de-vignetting of the SAIs in the raw image is avoided during pre-processing, because vignetting the SAIs amplifies noise in proportion to $\|(u,v)\|$. This keeps the dark noise level consistent between SAIs, making it easier to know whether a given image will be decodable. After sorting the SAIs in increasing order of $\|(u,v)\|$, the minimum value k is reflected in that:

$$SNR(\{L^{(u_1,v_1)}, L^{(u_2,v_2)}, \ldots L^{(u_k,v_k)}\}) \geq \tau. \quad (5)$$

In an embodiment shown in Equation 5, the minimum number of SATs needed to reach a given SNR threshold is determined. Sorting the SAIs in increasing order of $\|(u,v)\|$, and then summing the first k of them, implicitly acts as a greedy algorithm where the next SAI added is the brightest among unused SAIs. However, as described above, the optimal SAIs having minimal processing complexity, are those SAIs where the quantized shift parameter Δq is an integer, since those SAIs do not need interpolation.

On the other hand if, for example, Δq=1.5 pixels and SNR($\{L^{(0,0)}\}$) is so close to τ that adding any other SAI would produce a recognizable image, the greedy algorithm would sub-optimally choose one of $L^{(1,0)}$, $L^{(-1,0)}$, $L^{(0,1)}$, or $L^{(0,-1)}$ depending on how ties are broken during sorting. Since all of these require interpolation to effect the quantized shift, the computational complexity is higher than adding $L^{(2,0)}$ to $L^{(0,0)}$, which only requires memory lookups, since $2\Delta_q$ is an integer. Likewise, when $\Delta_q$ is quantized to thirds of pixels, adding $L^{(3,0)}$ is optimal because it is the brightest non-central SAIs whose use avoids interpolation. So determining an optimal set of SAIs to combine must consider both) SNR($\{L^{(0,0)}\}$) and $\Delta_q$. Formally, the optimization problem is defined as selecting a set $\{L^{(u1,v1)}, L^{(u2,v2)}, \ldots\} \subset L$ such that refocusing with these SAI provides SNR greater than τ and that no other subset of L does so at lower computational cost. Thus, w=SNR($\{L^{(0,0)}\}$) and denotes our desired set $L_w^{\Delta q}$. The number of subsets of L is exponential in the number of SAIs so, if Dansereau's toolbox is used, giving 121 SAIs, there are $2^{121} \approx 2.7*10^{36}$ subsets and a brute force approach is simply unpractical. Instead, in an embodiment, a tractable algorithm observes the optimal sub-structure property of property of $L_w^{\Delta q}$ with respect to the integer shift classes.

To determine an Optimal sub-structure lemma: $L_w^{\Delta q}$ represents a least-cost set of SAIs providing a refocused image with SNR($L_w^{\Delta q}$). If we remove from $L_w^{\Delta q}$ all SAIs from a given integer shift class R, the then remaining set of SAIs $L_w^{\Delta q}\backslash R$ must be the least cost subset producing a refocused image with SNR($L_w^{\Delta q}\backslash R$).

For example, suppose that there is a lower cost set $X \subset L \backslash R$ producing a refocused image with SNR($L_w^{\Delta q}\backslash R$). In that case, by the additivity property, the set $X \cup (L_w^{\Delta q} \cap R)$ must have a lower cost than $L_w^{\Delta q}$ while producing the same SNR, and the premise that $L_w^{\Delta q}$ is least-cost is contradicted.

In light of the optimal sub-structure lemma, $L_w^{\Delta q}$ can be found by dynamic programming. Let M(i,t) represent the maximum SNR that can be achieved in at most t milliseconds of computation using only the first i integer shift classes. The amount of time is denoted as the time it takes to extract an SAI from the sensor image and add that SAI to another SAI in its integer shift class as $t_a$, and the amount of time needed to interpolate the summed result of SAIs selected from the ith integer shift class $R_i$ as $t_i$. The integer shift classes are sorted by increasing $t_i$, and thus $$M(i,t)=M(i-1,w) \text{ if } t_i+t_a>t, \quad (6)$$

when there is insufficient time to interpolate and add even a single SAI from the ith integer shift class. Otherwise $$M(i, t) = \max(M(i - 1, t), \quad (7)$$
$$M(i-1, t-t_i-t_a) + SNR(\{L^{(u_1^i,v_1^i)}\}),$$
$$\ldots$$
$$M(i-1, t-t_i-kt_a) + SNR(\{L^{(u_1^i,v_1^i)}, L^{(u_2^i,v_2^i)}, \ldots L^{(u_k^i,v_k^i)}\}))$$

with the terms in the max( ) representing the use of 0, 1, ... k SATs from the ith integer shift class, whose members are sorted in increasing order of $\|(u,v)\|$ k is the lesser of the number of SAIs in the ith integer shift class and the value $[(t-t_i)/t_a]$, i.e. the maximum number of SAIs that can be combined within the time limits.

In order to solve for $L_w^{\Delta q}$, entries are filled of M for I=1, where the first integer shift class contains $L^{(u,v)}$ where u=0 mod q and v=0 mod q. The maximum value of t can be capped at $t_{max}$ where M(1, $t_{max}$)>τ, and the remaining values of M can be computed using equations 6 and 7. As in other applications of dynamic programming, the computation of M's values can be sped up by dividing $t_a$ and $t_i$ by their greatest common divisor.

Figure 4:
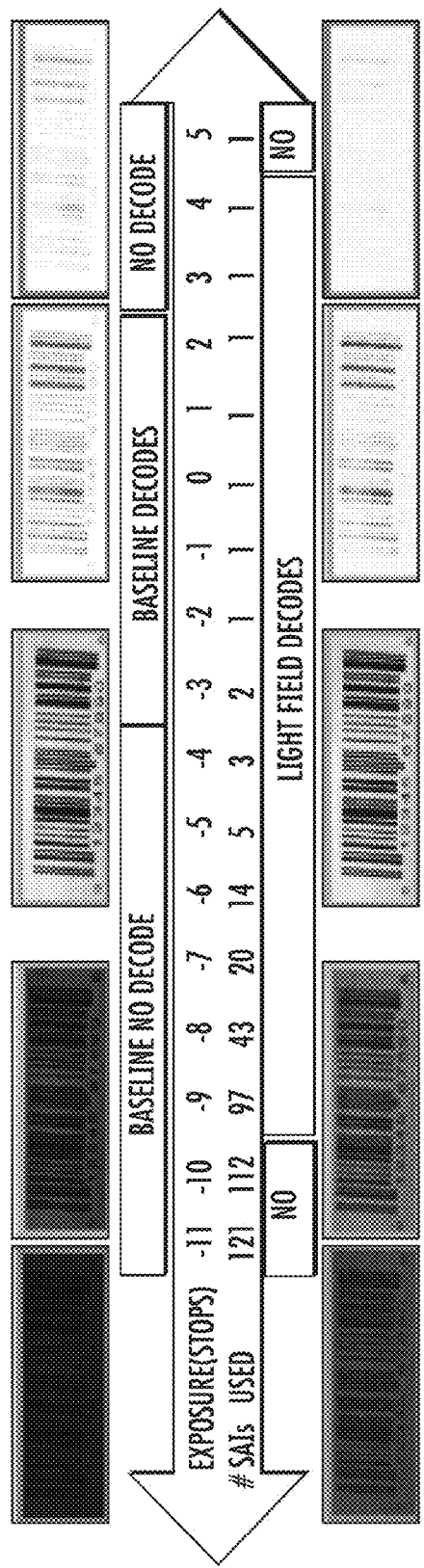
FIG. 4 is a graphical representation of a dynamic range performance of refocused images using a method of reducing computational complexity of light field imagers.

In an embodiment shown in FIG. 4, images of a 13 mil UPC-A barcode are captured at a distance of about 15 cm from a Lytro™ camera, with approximately 48 images captured over a range of 16 stops of exposure in 13 stop increments. These stops ranged from 11 stops under-exposed, to 5 stops over-exposed. In order to demonstrate the light-gathering advantages of Lytro's f/2 main aperture relative to a small aperture providing the same depth of field, the central SAI $L^{(0,0)}$ is compared to the captured images to see the exposure range over which the UPC-A barcode can be decoded. On the Lytro™ camera, the central SAI corresponds approximately to an f/22 aperture.

FIG. 4 summarizes the dynamic range performance of the refocused images according to the methods described above. At the low exposure range, the first successful decode of the central SAI is 3⅓ stops underexposed, and the first successful decode using the method is 9⅔ stops underexposed. This is an increase of 6⅓ stops of low end decoding dynamic range, meaning decoding can performed with $2^{-6.3}$=1:3% the amount of light as the small aperture approach. At the high exposure range, the last successful baseline decode is 2⅓ stops overexposed and the last successful decode of the images is 3⅔ stops overexposed. This is an increase of 1⅓, so the method can handle $2^{1.3} \approx 250\%$ as much light as before.

The embodiment of FIG. 4 also shows the number of SAIs used to make the refocused image. Numerically, 46% of the refocused images are simply single SAIs. At low exposure levels the refocused images use an increasing number of SAIs. Due to vignetting, the number of SAIs more than doubles when the exposure level is reduced by a stop. Since the distribution is so skewed, there is a big difference between the mean number of images used (14) and the median (2), but either represents a large saving relative to naive light field refocusing using all 121 SAIs all the time.

TABLE 1 iMX25 processing times for refocusing

| Op Code | ns/pixel | Operation Description |
|---------|----------|----------------------|
| A | 83 | Integer shift, add |
| B | 100 | 1D interpolation by 0.5px, add |
| C | 128 | 2D interpolation by 0.5px, add |
| D | 260 | 1D interpolation general, add |
| E | 335 | 2D interpolation general, add |

Table 1 shows empirically derived timing information using the methods described herein, providing performance of embedded recognition systems without high-end modern processors. In Table 1, elements of shift-and-add refocusing according to the methods described herein, were performed on a Freescale Semiconductor iMX25 development board, which has a 32-bit ARM926EJS processor with a single 400 MHz core. The components of shift-and-add refocusing were timed on several images of different sizes, and show the average complexity of per-pixel per-SAI operations. Because the iMX25 doesn't have hardware support for floating point arithmetic, and software emulation is extremely expensive, multiplications and divisions by non-integer quantities are approximated by the nearest rational number, e.g. multiplication by 0.66 is implemented by multiplication by 2 followed by a division by 3.

In a baseline implementation, shift-and-add refocusing involves independently registering each of the non-central SAIs via 2D interpolation and then adding to $L^{(0,0)}$. This has a complexity of 120 SAIs*335 ns/SAI=0.040 ms per pixel, so refocusing a 256×256 pixel grayscale image would take about 2.6 seconds. A more efficient baseline, where all SAIs with a given value of u are combined via 1D interpolation before a second 1D interpolation in the v direction reduces this to 120 1D interpolations taking ~0.031 ms per pixel or 2 seconds for the same sized image.

Since the set $L_w^{\Delta q}$ of SAIs combined using the embodiments of the method depends on both w and the quantized shift parameter Δq, the computational complexity of the method depends on both the exposure level and the target's position relative to the main lens' plane of focus. In an ideal case, when $L_w^{\Delta q}=\{L^{(0,0)}\}$ because the central SAI is sufficiently well exposed, the method's refocusing is a nonoperation and does not require any processing time. In the ideal case, the light field camera, such as the Lytro™ camera, is simply acting like a traditional camera with a small aperture.

Figure 2A:
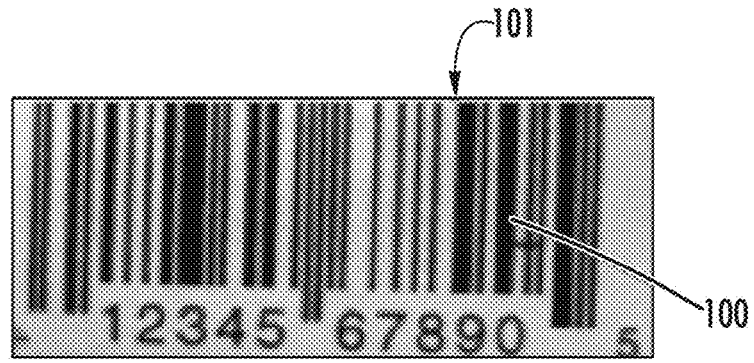
FIG. 2a is a first image of a 1D barcode using the conventional baseline approach of combining all views.
Figure 2B:
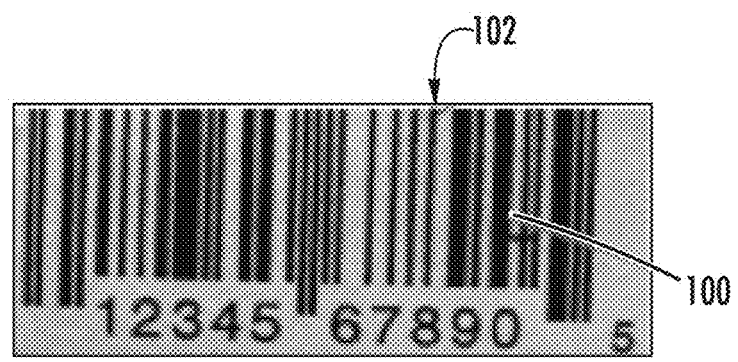
FIG. 2b is a second image of the 1D barcode using a limited number of views.
Figure 2C:
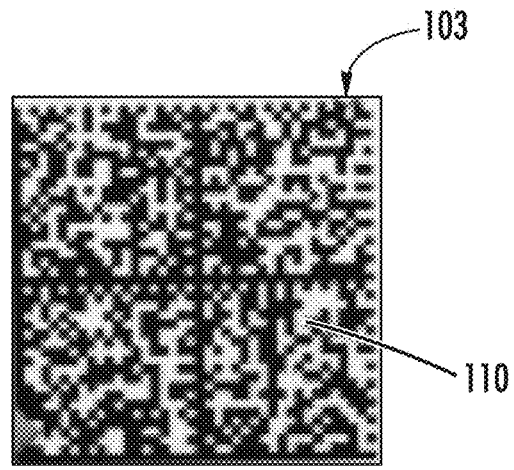
FIG. 2c is a third image of a 2D barcode without a conventional baseline approach without a quantized refocus parameter
Figure 2D:
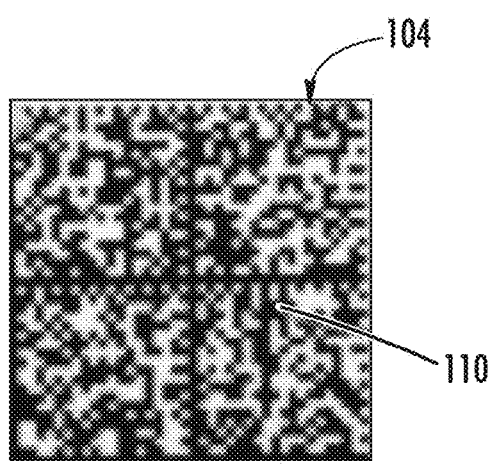
FIG. 2d is a fourth image of the 2D barcode with the quantized refocus parameter.

In an embodiment shown in FIGS. 2a-2d, FIG. 2a shows a first image 101 of a 1D barcode 100 using the conventional baseline approach of combining all 121 SAIs. The computational cost in producing the first image 101 is approximately 402 ms. FIG. 2b shows a second image 102 of the 1D barcode 100 produced using the methods described herein by combining only 6 views. The computational cost of producing the second image 102 by processing the limited number of views is approximately 17 ms. FIG. 2c shows a third image 103 of a 2D indicia 110 produced using the conventional baseline approach that does not quantize a refocus parameter (i.e. no shift quantization). The computational cost of producing the third image 103 is approximately 1280 ms. FIG. 2d shows a fourth image 104 of the 2D indicia 110 produced using the methods described herein by quantizing the refocus parameter. The computational cost of producing the fourth image 104 is approximately 21 ms.

Figure 5:
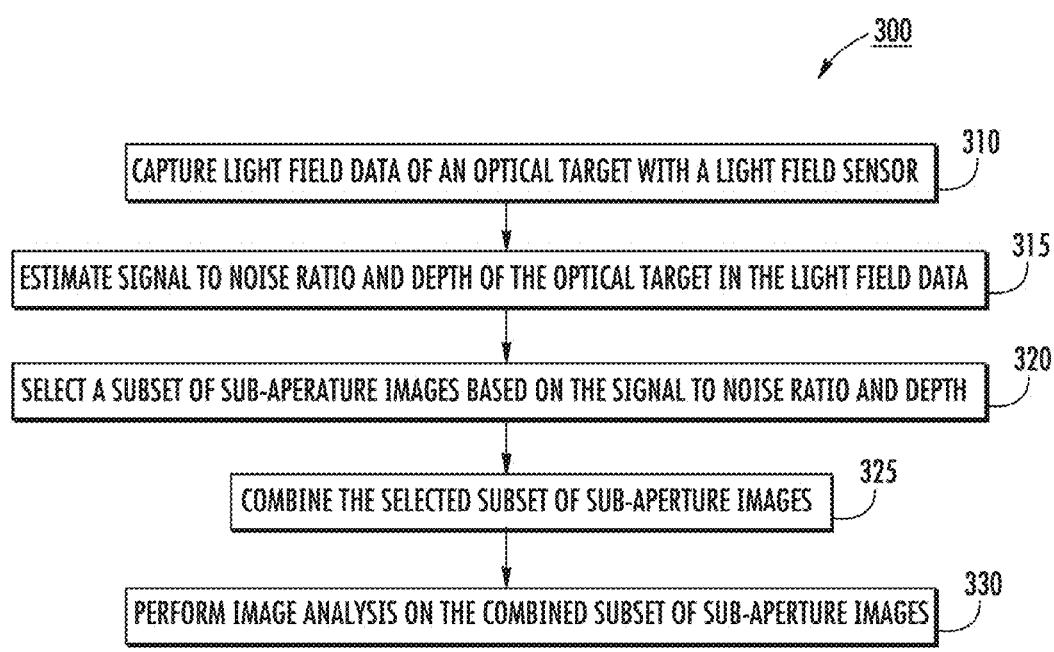
FIG. 5 is a block diagram of the method for reducing computational complexity of light field imagers.

As shown in an embodiment of FIG. 5, a method 300 of reducing computational complexity of light field imagers 1 includes capturing light field data of an optical target, such as a decodable indicia, with a light field sensor 30 at block 310, where the light field data comprises a plurality of sub-aperture images.

The method 300 includes estimating signal to noise ratio and depth of the optical target in the light field data at block 315. In an embodiment, estimating the signal to noise ratio is performed using sensor characterization of sensor noise level, gain, exposure time, or any combination thereof. In another embodiment, sensor characterization is determined from pixel intensities of the light field sensor 30. In an embodiment, estimating depth of the optical target from the light field imager is determined directly from the light field data. In an embodiment, estimating depth of the optical target from the light field imager is through registration of two sub-aperture images.

The method 300 includes selecting a subset of sub-aperture images based on the signal to noise ratio and depth at block 320. In an embodiment, the subset of sub-aperture images is selected from a pre-determined table comprising optimal subsets of sub-aperture images at different signal to noise ratios and depths of a theoretical optical target from the light field imager.

The method 300 includes combining the selected subset of sub-aperture images at block 325. In an embodiment, combining the subset of sub-aperture images includes a quantized shifting and adding together of the subset of sub-aperture images.

The method 300 includes performing image analysis on the combined subset of sub-aperture images at block 330. In an embodiment, the image analysis is identifying and decoding a decodable indicia. In another embodiment, the image analysis is facial recognition. In yet another embodiment, the image analysis is iris recognition.

Accordingly, the methods described herein optimally selects a set of SAIs which, after quantized shift-and-add refocusing, produce a recognizable image with the least possible computation compared to conventional approaches. Utilizing the recognition algorithm's dynamic range and robustness to defocus permits the selection of a minimal number of SAIs that need to be combined, and to manipulate the precision with which those SAIs are registered to one another. Jointly optimizing over the number of SAIs and the precision of registration achieves up to a 99% reduction in computational complexity over the conventional approaches.

To supplement the present disclosure, this application incorporates entirely by reference the following patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,625;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;

U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;

U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

What is claimed is:

1. An imaging device, comprising:
a light field imager, comprising:
   a microlens array; and
   a light field sensor positioned proximate to the microlens array, having a plurality of pixels and recording light field data of an optical target from light passing through the microlens array; and
a processor configured to:
   receive the light field data of the optical target from the light field sensor;
   estimate signal to noise ratio and depth of the optical target in the light field data;
   select a subset of sub-aperture images based on the signal to noise ratio and depth;
   combine the selected subset of sub-aperture images; and
   perform image analysis on the combined subset of sub-aperture images.

2. The imaging device of claim 1, wherein the light field data comprises a plurality of sub-aperture images.

3. The imaging device of claim 2, wherein estimating the signal to noise ratio is performed using sensor characterization.

4. The imaging device of claim 3, wherein sensor characterization includes sensor noise level, gain, exposure time, or any combination thereof.

5. The imaging device of claim 4, wherein sensor characterization is determined from pixel intensities.

6. The imaging device of claim 1, wherein estimating depth of the optical target from the light field imager is directly determined from the light field data.

7. The imaging device of claim 1, wherein estimating depth of the optical target from the light field imager is through registration of two sub-aperture images.

8. The imaging device of claim 1, comprising a predetermined table of optimal subsets of sub-aperture images at different signal to noise ratios and depths of a theoretical optical target from the light field imager.

9. The imaging device of claim 8, wherein the subset of sub-aperture images is selected from the pre-determined table.

10. The imaging device of claim 1, wherein combining the subset of sub-aperture images includes a quantized shifting and adding together the subset of sub-aperture images.

11. The imaging device of claim 1, wherein the imaging device is an indicia scanner.

12. The imaging device of claim 1, wherein the image analysis is facial recognition.

13. The imaging device of claim 1, where the image analysis is iris recognition.

14. A method, comprising:
capturing light field data of an optical target with a light field sensor;
estimating signal to noise ratio and depth of the optical target in the light field data;
selecting a subset of sub-aperture images based on the signal to noise ratio and depth;
combining the selected subset of sub-aperture images; and
performing image analysis on the combined subset of sub-aperture images.

15. The method of claim 14, wherein the light field data comprises a plurality of sub-aperture images.

16. The method of claim 15, wherein estimating the signal to noise ratio is performed using sensor characterization of sensor noise level, gain, exposure time, or any combination thereof.

17. The method of claim 14, wherein estimating depth of the optical target from the light field imager is determined directly from the light field data.

18. The method of claim 14, wherein estimating depth of the optical target from the light field imager is through registration of two sub-aperture images.

19. The method of claim 16, wherein the subset of sub-aperture images is selected from a pre-determined table comprising optimal subsets of sub-aperture images at different signal to noise ratios and depths of a theoretical optical target from the light field imager.

20. The method of claim 19, wherein combining the subset of sub-aperture images includes a quantized shifting and adding together the subset of sub-aperture images.

* * * * *